United States Patent
Sumi

[11] Patent Number: 6,118,471
[45] Date of Patent: Sep. 12, 2000

[54] BEAM DIAMETER CONTROL METHOD AND DEVICE

[75] Inventor: Katsuto Sumi, Kanagawa, Japan

[73] Assignee: Fuji Photo Film Co., Ltd., Kanagawa, Japan

[21] Appl. No.: 08/911,143

[22] Filed: Aug. 14, 1997

[30] Foreign Application Priority Data

Aug. 19, 1996 [JP] Japan ................................. 8-234653

[51] Int. Cl.$^7$ .................................................. B41J 2/435
[52] U.S. Cl. .......................... 347/253; 347/244; 347/256
[58] Field of Search ................................... 347/134, 244, 347/253, 256, 258, 241; 359/364, 110; 372/9

[56] References Cited

U.S. PATENT DOCUMENTS

| | | | |
|---|---|---|---|
| 4,642,701 | 2/1987 | Maeda et al. | 347/256 |
| 4,978,970 | 12/1990 | Okazaki | 347/241 |
| 5,157,649 | 10/1992 | Suzuki | 369/110 |
| 5,321,435 | 6/1994 | Mochizuki et al. | 347/131 |
| 5,383,052 | 1/1995 | Okazaki et al. | 359/364 |
| 5,477,554 | 12/1995 | Yoshii et al. | 372/9 |

FOREIGN PATENT DOCUMENTS

| | | | |
|---|---|---|---|
| 2 062 282 | 5/1981 | European Pat. Off. | |
| 476 931 A2 | 3/1992 | European Pat. Off. | |
| 525995 | 7/1992 | European Pat. Off. | 347/259 |
| 196 19 339 A1 | 11/1996 | Germany. | |

OTHER PUBLICATIONS

Patent Abstracts of Japan, Kuwayama Takeshi, "Optical Scanner of Laser Beam Printer" Apr. 18, 1985, Publication No. 60068317.

Primary Examiner—N. Le
Assistant Examiner—Anh T. N. Vo
Attorney, Agent, or Firm—Sughrue, Mion, Zinn, Macpeak & Seas, PLLC

[57] ABSTRACT

There is provided beam diameter control method and device for changing a focused beam diameter of a laser beam, which can increase light utilization without incorporating a complicated and expensive optical or zoom system. In the beam diameter control method and device, an optical path difference equal to or more than a coherence length of the laser beam is applied to a portion of light flux of the laser beam before the laser beam is focused. A transparent plate is provided to apply such an optical path difference. The laser beam is preferably emitted from a longitudinal multi-mode semiconductor laser the coherence length of which is short. The transparent plate may be a parallel flat plate or ring-like plate placed near the center of the light flux. The transparent plate is preferably placed within the parallel beam portion of the laser beam. The transparent plate may be placed in a divergent beam portion or a convergent beam portion instead. In this case, the quantity of light flux divided by the transparent plate can be easily changed by moving the position of the transparent plate in a direction parallel to the optical axis.

17 Claims, 6 Drawing Sheets

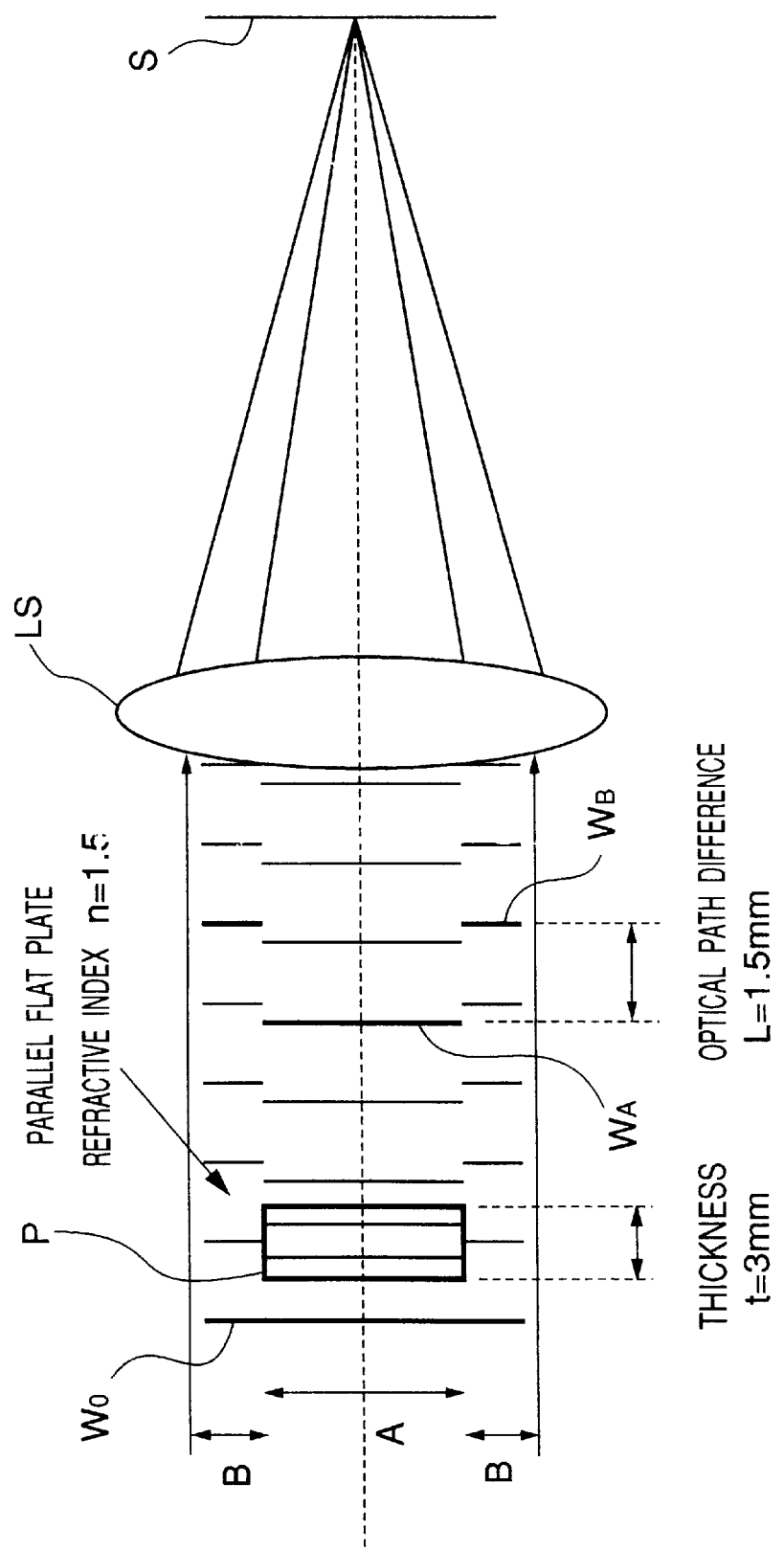

FIG.2A
CASE WHERE LIGHT FLUX IS NOT DIVIDED
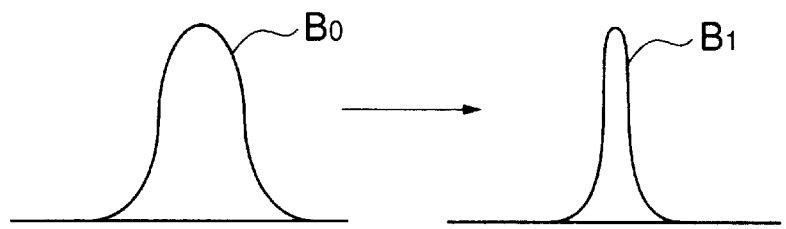
FIG.2B
CASE WHERE LIGHT FLUX IS DIVIDED
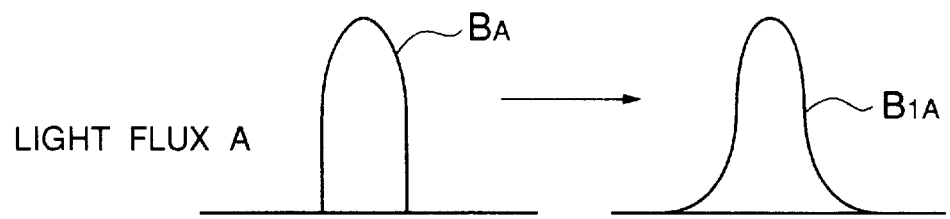
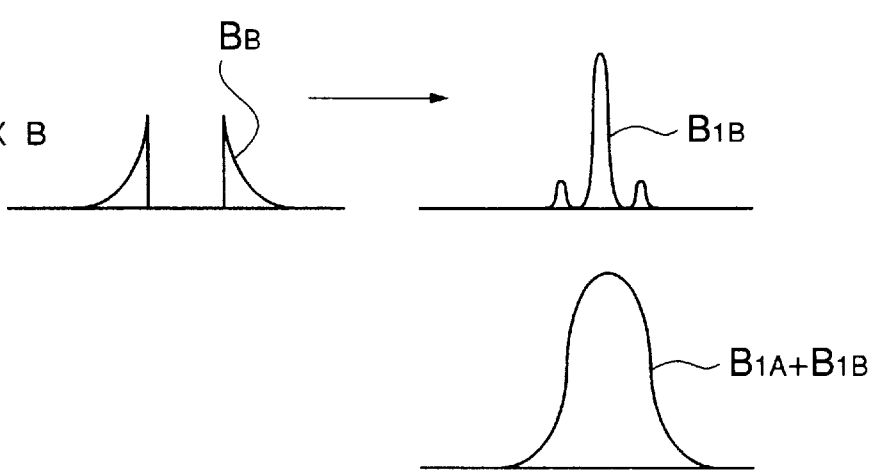

BEAM DIAMETER CONTROL METHOD AND DEVICE

BACKGROUND OF THE INVENTION

1. Field of the Invention

The present invention relates to method and device used in apparatuses such as light beam scanning apparatuses for reading or recording images with a laser beam to be scanned on a recording or recorded surface while focusing the laser beam thereon.

2. Related Art

In such light beam scanning apparatuses, the diameter of the laser beam focused on the recording or recorded surface (hereinafter, simply referred to as focused beam diameter) needs to be changed according to the image recording or reading density. In other words, the focused beam diameter must be changed according to the scanning density. For example, the focused beam diameter needs to be expanded when the image recording (reading) density is reduced (i.e., when the scanning density is reduced).

Conventionally, two types of methods for changing a focused beam diameter have been proposed. The first method uses an aperture stop (see Unexamined Japanese Patent Publication (KOKAI) Nos. 141662/1981 and 144850/1983). The second method is to control the focused beam diameter by changing the magnification of an optical system. In the first method, the aperture stop is inserted in a collimated (parallel) portion of the light beam to limit the diameter of light flux of the collimated beam (parallel beam). In other words, the first method uses eclipse or shading to expand the focused beam diameter.

A focused beam diameter d is generally given by the following equation:

$$d = K\lambda f/D,$$

where K is a coefficient, $\lambda$ is a beam wavelength, f is a focal length of a scanning lens (focusing lens) and D is a diameter of light flux of a beam to be incident on the scanning lens (hereinbelow, referred to as an incident beam diameter). The beam diameter d also becomes equal to a diameter of a circle formed by connecting points where a beam power of $1/e^2$ (approximately equal to 0.135) to the maximum beam power point (the center point of the beam) is obtained.

As apparent from the above equation, the incident beam diameter D is made small to expand the focused beam diameter d. Stated more strictly, the first method is to control the beam diameter d by changing the incident beam diameter D. Assuming that an incident beam diameter when d=10 $\mu$m is $D_0$, when the focused beam diameter d needs to be expanded to 13 $\mu$m, an aperture stop capable of reducing the incident beam diameter D to $D=10/13=0.77D_0$ must be inserted in a portion of the incident beam (parallel beam).

In the second method, the collimated beam diameter to be incident on the scanning lens is generally large, and therefore a beam expander system is used for generating a beam having such a large diameter, thus making the focused beam diameter variable by changing the optical magnification of the beam expander system.

Since the first method uses an aperture stop to shade a portion of the incident beam so that the focused beam diameter can be expanded, incident beam utilization is reduced. The focused beam diameter is expanded in order to reduce the scanning density and so that the recording density is made rough. Although the quantity of light required for expanding the focused beam diameter is larger than that required when high-density recording is carried out with a small focused beam diameter, the quantity of light to be shaded by the aperture stop is actually increased and the quantity of light to be used as the focused beam is reduced.

On the other hand, the second method requires use of plural optical systems with plural lenses or a zoom system as the expander system. For this reason, the optical systems and the associated movable adjusting mechanism are made complicated, and besides, they are expensive.

SUMMARY OF THE INVENTION

The present invention has been accomplished under the circumstances as aforementioned, and a first object thereof is to provide a beam diameter control method capable of increasing light utilization without incorporating a complicated and expensive optical or zoom system.

A second object of the present invention is to provide a beam diameter control device by which the beam diameter control method is directly carried out.

The first object of the present invention is attained by the provision of a beam diameter control method for changing a diameter of a focused laser beam, comprising:

applying an optical path difference to a portion of light flux of the laser beam, the optical path difference being equal to or more than a coherence length of the laser beam; and focusing the laser beam including said portion of the light flux to which the optical path difference has been applied and the other portion of the light flux;

whereby the diameter of the focused laser beam is expanded.

The second object of the present invention is attained by the provision of a beam diameter control device for changing a diameter of a focused laser beam, comprising:

a transparent plate for applying an optical path difference to a portion of light flux of the laser beam, the optical path difference being equal to or more than a coherence length of the laser beam, said transparent plate being provided in front of a focusing lens which focuses the laser beam including the portion of the light flux to which the optical path difference has been applied and the other portion of the light flux.

The laser beam used in the present invention is preferably emitted from a longitudinal multimode semiconductor laser or a semiconductor laser which superposes high-frequency current to emit a laser beam in a longitudinal multimode. Such semiconductor lasers have a very short length of coherent light compared to that of a gas laser or solid-state laser.

The transparent plate may be a parallel flat plate arranged near the center of the light flux of the laser beam. The transparent plate is preferably placed within the parallel or collimated beam of laser light. To hold the transparent plate within the light flux of laser light, a transparent support plate of a constant thickness through which all the light flux of the laser light is passed may be provided so that the transparent plate can be fixed thereto. Further, the transparent plate may be a ring-like transparent plate.

The shape of the transparent plate can be somewhat wedge-like. There will be no problem with the shape of the transparent plate even if the end surface thereof has some curvature as long as the optical path difference between the center and the end surface is small enough not to cause any interference. Preferably, the end surface of the transparent plate is coated with an anti-reflection film and a black coat is applied to the surface through which no beam is passed so that no undesired beam of light will occur.

Furthermore, the transparent plate may be placed in a divergent beam portion or a convergent beam portion instead of a portion of the parallel beam (collimated beam). In this case, the quantity of light flux divided by the transparent plate, i.e., the ratio of light flux divided by the transparent plate to all the light flux can be easily changed by moving the position of the transparent plate in a direction parallel to the optical axis. It is also possible to vary the quantity of light flux to pass through the transparent plate by tilting the transparent plate with respect to the optical axis.

Although the transparent plate placed in the light flux may be one, two or more transparent plates different in thickness or optical path length can be inserted instead. In such a case, the optical path difference between the laser beam portions passing through the respective transparent plates must be set larger than the coherence length.

A detour optical-path system can be used instead of the transparent plate, in which prisms are used to lead a portion of the light flux to a detour and so that an optical path difference is applied. In this case, the optical path length of the detour optical-path can be adjusted by changing the relative position of the prisms, so that the optical path difference can be changed continuously, thereby easily determining an optimum optical-path difference.

BRIEF DESCRIPTION OF THE DRAWINGS

The above and other objects and advantages and further description will now be discussed in connection with the drawings, in which:

FIG. 1 is a diagram explaining the principle of the present intention;

FIGS. 2A and 2B are graphs showing intensity distributions of the light beam;

PRINCIPLE OF THE INVENTION

Figure 3A:
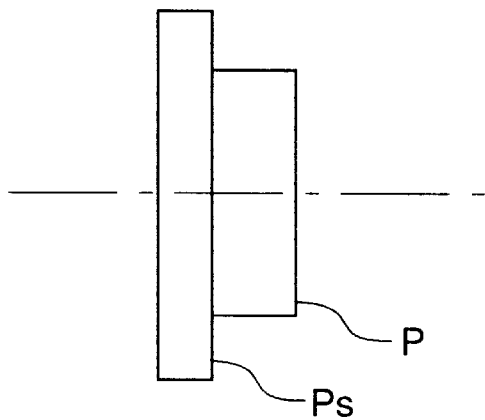
FIGS. 3A and 3B are side and plan views of a transparent plate P, which show an embodiment of a beam diameter control device.

FIG. 1 is a diagram explaining the principle of the present invention, and FIGS. 2A and 2B are graphs showing intensity distributions of the light beam. Referring first to these drawings, the principle of the present invention will be described.

The parallel beam (collimated beam) shows a Gaussian distribution in which the intensity of the parallel beam is gradually reduced from the center of the light flux to the outside. Assuming that the parallel beam is incident on a scanning lens (focusing lens) LS from the left side of FIG. 1 and focused on a recording surface S, a transparent plate P having the shape of a circular, parallel flat plate is placed in the center of the parallel beam, with its refractive index n set to 1.5 and thickness t to 3.0 mm.

When the incident parallel beam reaches the transparent plate P, a portion of a wavefront $W_0$ passes through the transparent plate P to form a beam portion A, while the other portions of the wavefront $W_0$ become a beam portion B without passing through the transparent plate P. In other words, the wavefront $W_0$ is divided into a wavefront $W_A$ of the beam portion A passing through the transparent plate P and a wavefront $W_B$ of the beam portion B going straight without passing through the transparent plate P, and as a result, an optical path difference L is caused therebetween. When a refractive index of air is $n_0$, since $n_0=1$, the optical path difference amounts to $L=(n-n_0)t=(1.5-1.0)\times 3.0=1.5$ mm.

With a longitudinal multimode semiconductor laser, since a coherence length Lc is about 1.0 mm, the optical path difference L is larger than the coherence length and enough to prevent interference between the beam portions A and B. Therefore, the beam portions A and B agree with the sum of the individual intensity, not the amplitude.

FIG. 2A shows a case where there is no transparent plate P and the beam is not divided. In this case, the incident parallel beam (collimated beam) distributed with intensity $B_0$ is converged by the focusing lens LS and turned into a focused beam distributed with intensity $B_1$ on the recording surface S.

FIG. 2B shows a case where the transparent plate P is inserted in the incident beam as shown in FIG. 1. In this case, the beam portion A distributed with intensity $B_A$ is converged by the scanning lens LS and turned into a focused beam exhibiting an intensity distribution $B_{1A}$, while the beam portion B distributed with intensity $B_B$ is turned into a focused beam exhibiting an intensity distribution $B_{1B}$. Both beam portions A and B are thus concentrated on the recording surface S and turned into a focused beam having intensity $(B_{1A}+B_{1B})$ that agrees with the sum of the individual intensity $B_{1A}$ and $B_{1B}$.

As a result, the diameter of the focused beam $(B_{1A}+B_{1B})$ is expanded as shown in FIG. 2B when compared to the focused beam $B_1$ shown in FIG. 2A. Although the incident beam is divided at this time, light utilization is never reduced because all the light flux (all the portions) of the incident beam is led to the recording surface S. The diameter of the focused beam $(B_{1A}+B_{1B})$ can be changed arbitrarily to some degree by changing the diameter of the transparent plate P or the optical path difference (i.e., by changing the refractive index n or the thickness t of the transparent plate P). The use of the transparent plate makes the apparatus arrangement simple, and besides it is inexpensive, compared to the conventional mechanism using plural lenses or a zoom system.

DETAILED DESCRIPTION OF THE PREFERRED EMBODIMENTS

Embodiments of Beam Diameter Control System

Figure 3B:
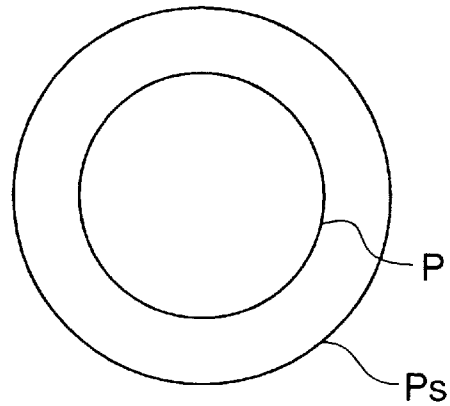

FIGS. 3 and 4 show embodiments of beam diameter control devices according to the present invention. FIGS. 3A and 3B are side and plan views of a transparent plate P according to an embodiment, in which the transparent plate P is held by a transparent support plate $P_S$ through which all the light flux of the incident beam is passed. The transparent plate P used here can be a cylinder-like parallel flat plate.

Figure 4A:
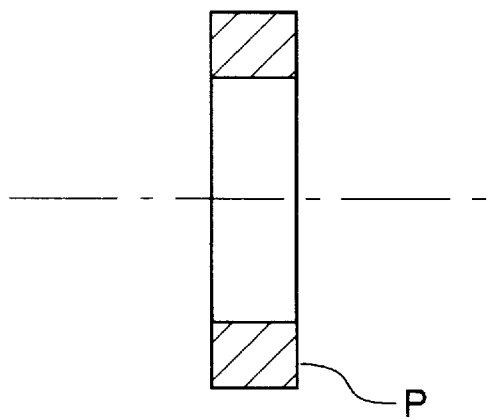
FIGS. 4A and 4B are side sectional and plan views of a ring-like transparent plate P, which show another embodiment of a beam diameter control device.
Figure 4B:
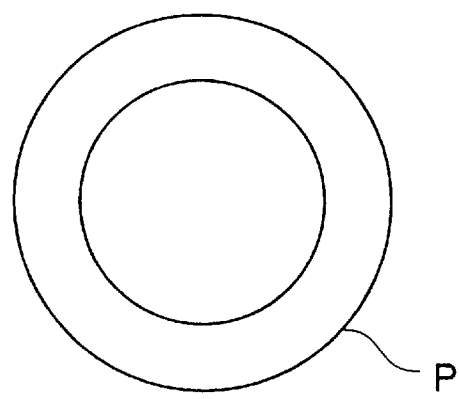

FIG. 4A is a side view of a transparent plate P according to another embodiment, and FIG. 4B is a plan view thereof as seen from the optical axis. In this embodiment, a ring-like (annular) transparent plate P is provided around the outer edge of the light flux of the parallel beam. The transparent plate P shown in FIGS. 3A and 3B, and the central aperture of the transparent plate P shown in FIGS. 4A and 4B are preferably formed into a circular shape, but they may have any other shape such as an elliptical, rectangular or wedge-like shape depending on the desired shape of the focused beam.

Figure 5:
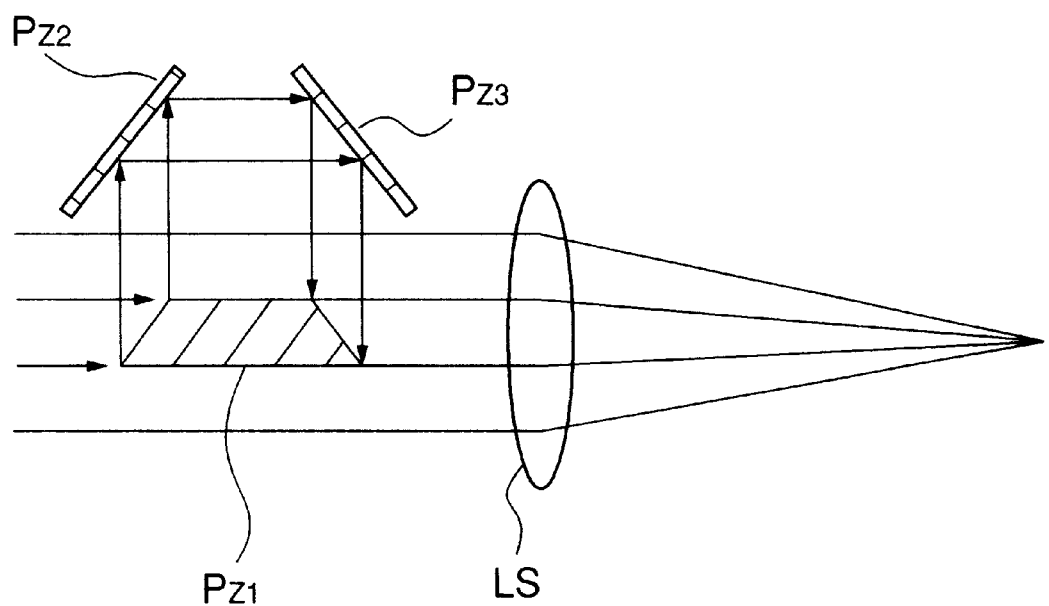
FIG. 5 is a diagram showing other embodiment of a beam diameter control device, in which a detour optical-path system is provided for detouring a portion of the parallel beam.

FIG. 5 shows other embodiment of a beam diameter control system according to the present invention. In this embodiment, a detour optical-path system is provided for detouring a portion of the light flux of the parallel beam. Specifically, a prism $P_{Z1}$, made from a cylinder-like rod with both end surfaces being cut 45°, is placed in the light flux, and prisms $P_{Z2}$ and $P_{Z3}$ are arranged on both sides so a detour can be formed together with the prism $P_{Z1}$.

The prisms $P_{Z2}$ and $P_{Z3}$ can be moved in both side directions, respectively, relative to the prism $P_{Z1}$ to continuously change the optical path length of the detour. In other words, the incident beam can be divided into two portions, between which no interference occurs, by setting an optimum optical-path length of the detour. Such a system provides an optical path difference large enough to use a laser beam having a long coherence length.

Embodiment of Scanning Apparatus

Figure 6:
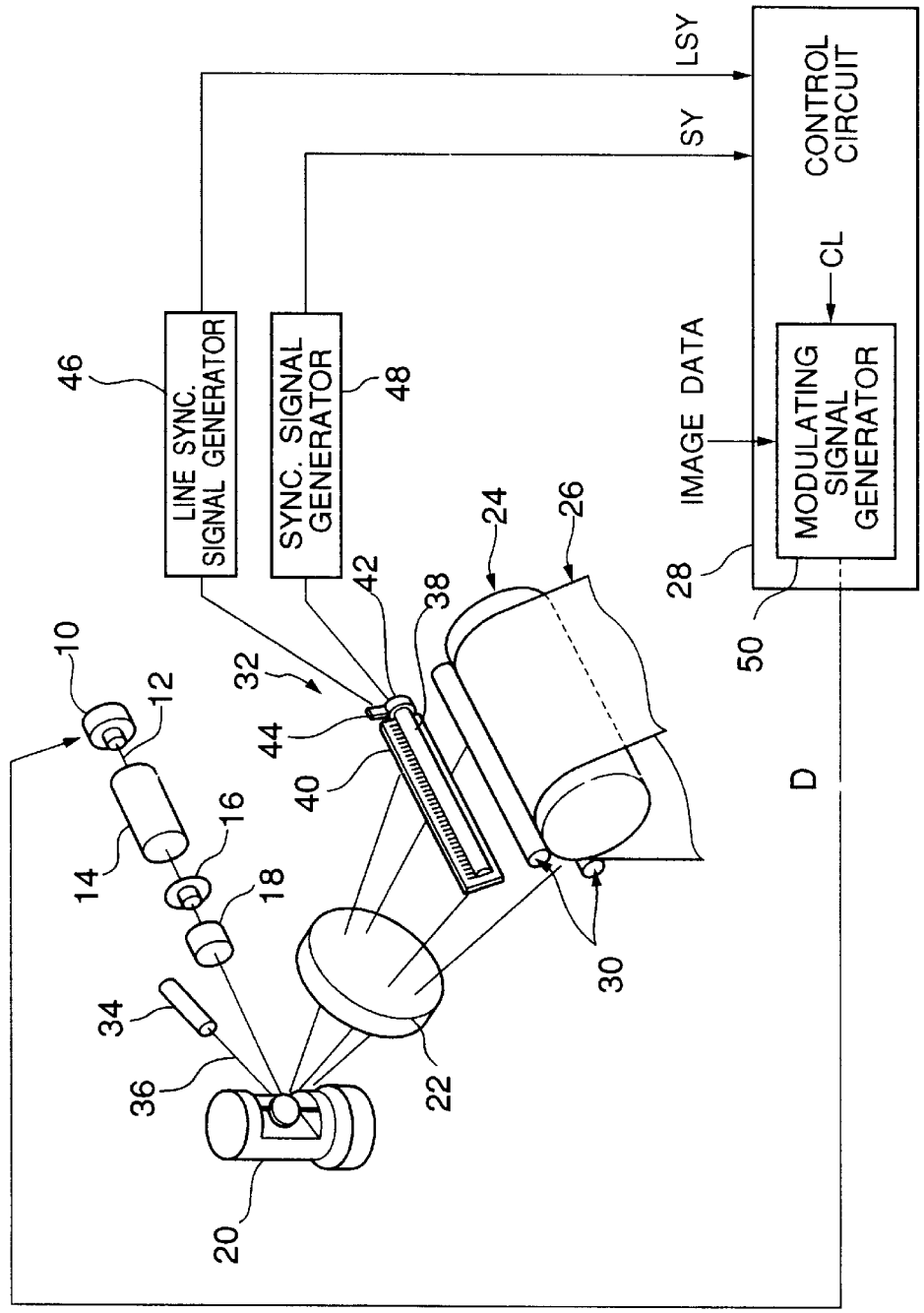
FIG. 6 is a diagram showing an embodiment in which the present invention is applied to an optical beam scanning apparatus.

FIG. 6 shows an embodiment of an optical beam scanning apparatus which uses a beam diameter control device according to the present invention. In FIG. 6, reference numeral 10 denotes a semiconductor laser as a recording light source from which a laser beam as a recording light beam 12 is emitted. The light beam 12 is led to a recording film 26 wound on a drum 24, through a collimator lens 14, a beam diameter control device 16, a focusing lens 18, a resonant scanner 20 and a scanning lens (fθ lens) 22.

A control circuit 28 controls the semiconductor laser 10 to turn on or off the light beam 12 in accordance with image data to be recorded on the recording film 26. The collimator lens 14 turns the laser beam into a parallel beam. The beam diameter control device 16 is constructed by the transparent plate P or the detour optical-path system as shown in FIGS. 2 through 5.

The resonant scanner 20 has a mirror rotatable around an axis perpendicular to a plane to be scanned with the light beam, and the mirror is oscillated due to resonance of a flat spring. The scanning lens 22 maintains a constant scanning speed of the light beam 12 on the recording film 26. In addition, nip rollers 30 are provided for bringing the recording film 26 in full contact with the surface of the drum 24.

Reference numeral 32 denotes synchronizing signal generator. In operation, s synchronizing light source 34 emits a laser beam for use as a synchronizing light beam 36. The light beam 36 is led through the resonant scanner 20 and the scanning lens 22 to a focusing rod 38. The focusing rod 38 is a rod-shaped focusing lens arranged close to and in parallel to the drum 24. A synchronizing reference plate 40 is provided in front of the focusing rod 38, which has a grid for transmitting the light beam 36 intermittently at constant intervals, and a photosensor 42 is attached to one end of the focusing rod 38.

When the light beam 36 is incident on the focusing rod 38 through the reference plate 40, the photosensor 42 detects the light beam 36 and its scanning position. Since the light beam 36 is scanned by the resonant scanner 20 in the same manner as the recording light beam 12, the scanning position of the recording light beam 12 can be obtained from the scanning position of the light beam 36. In addition, a line synchronizing photosensor 44 is provided for detecting scanning start timing to the light beam 36.

The control circuit 28 will be described next. An output signal from the photosensor 44 is subjected to waveform shaping by a line synchronizing signal generator 46 and turned into a line synchronizing signal LSY, while an output signal from the photosensor 42 is subjected to waveform shaping by a synchronizing signal generator 48 and turned into a synchronizing signal SY. Both synchronizing signals are input to the control circuit 28, respectively. The control circuit 28 properly provides a delay time to the synchronizing signal SY.

Based on data from a CPU (not shown) that represents a recording area, the control circuit 28 generates a recording area signal AR in synchronization with a synchronizing signal SYD caused at the beginning of horizontal or main scanning line in the area.

On the other hand, the synchronizing signal SY is multiplied by a PLL circuit as a frequency multiplier. For example, the frequency of the synchronizing signal SY is multiplied by a factor of ten, and an image data clock CL is obtained by taking the logical product (AND operation) of the synchronizing signal SY and the recording area signal AR.

The image data clock CL is a timing pulse by which an image is written onto scanning lines. The clock CL is input to a modulating signal generator 50 together with image data sent from an image data generator, not shown, and a driving signal D for driving the semiconductor laser 10 is generated at the modulating signal generator 50.

In the embodiment, when the image is recorded on the recording film 26 with high recording density, i.e., with high scanning density, the beam diameter control device 16 consiting of the transparent plate P is removed from the optical path, and thereby the diameter of the focused beam is reduced as indicated with $B_1$ in FIG. 2A. If the recording density is low, the transparent plate P will be inserted to expand the beam diameter of the focused beam ($B_{1A}$+$B_{1B}$) as shown in FIG. 2B. When using the detour optical-path system of FIG. 5 instead of the transparent plate P, the diameter of the focused beam can be changed by adjusting the position of the prism $P_{Z2}$.

Other Embodiment of Scanning Apparatus

Figure 7:
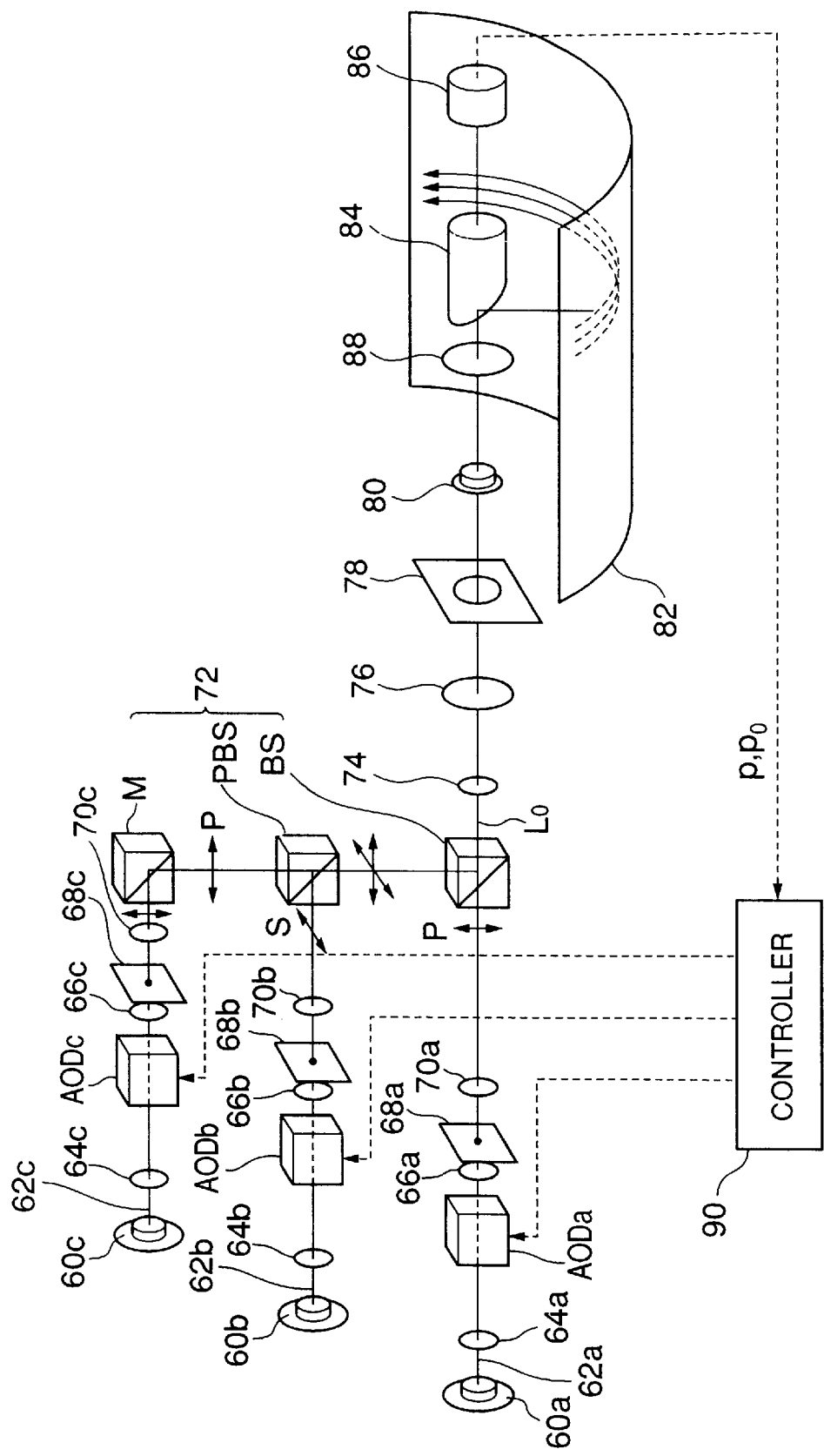
FIG. 7 is a diagram showing another embodiment in which the present invention is applied to other optical beam scanning apparatus.

FIG. 7 shows a concept of a cylindrical inside surface scanning type image recording apparatus according to another embodiment. In FIG. 7, there are shown three laser diodes 60 (60a, 60b and 60c) for use as light beam output means, each of which emits a laser beam 62 (62a, 62b or 62c) having an identical wavelength and an identical intensity. These laser beams 62a, 62b and 62c are passed through collimator lenses 64 (64a, 64b and 64c), two-dimensional acousto-optical deflection elements AOD (AODa, AODb and AODc), AOD radiating lenses 66 (66a, 66b and 66c), null light cutting plates 68 (68a, 68b and 68c) and collimator lenses 70 (70a, 70b and 70c), respectively, and combined by an optical system 72.

Each of the laser beams 62 (62a, 62b and 62c) is turned into a parallel beam of light by the collimator lens 64, deflected by the AOD, and only a primarily diffracted beam of light is selected while passing through the AOD radiating lens 66 and the null light cutting plate 68. Then, the selected beam is returned to a parallel beam of light and led to the wave combining optical system 72.

The AOD is driven by a transducer generating a supersonic wave of a given frequency as a rotating angle θ of a spinner 84 changes in a manner described later. The primarily diffracted beam of light caused when the AOD is driven is selected by the null light cutting plate 68. The transducer controls the deflecting direction of the primarily diffracted beam of light in accordance with its drive frequency. When turning on or off a binary image signal, the output of the laser diode 60 is switched on or off to turn the laser beam 62 on or off.

In the embodiment, the three AODs two-dimensionally change the laser beams 62a, 62b and 62c, respectively, to correct curvatures and intervals of the scanning lines.

The wave combining optical system 72 consists of a total reflection mirror M, a polarized beam splitter PBS and a beam splitter BS. The laser diodes 60a, 60b and 60c each output a laser beam polarized linearly, and respective polarizing directions are set as indicated with arrows in FIG. 7.

Stated more specifically, the laser diodes 60a and 60c are each mounted at an angle to output such a polarized beam (P polarized beam) that a plane of vibration in an electric field of an incident plane wave to the mirror M and the beam splitter, respectively, is parallel to the incident plane (where both of incident light and reflected light are contained). The mounting angle of the laser diode 60b is set to output such a polarized beam (S polarized beam) that a plane of vibration in an electric field of an incident plane wave to the polarized beam splitter PBS is perpendicular to the incident plane.

The laser beams 62a, 62b and 62c are combined substantially into a laser beam $L_0$. Although the laser beam $L_0$ is represented as a single beam of light in FIG. 7, it is actually composed of three beams the optical axes of which are different in direction from each other.

Beam expander lenses 74 and 76 further expand and change the diameter of the wave-combined laser beam $L_0$, then an aperture plate 78 eliminates flare light (stray light) and controls the diameter of the light flux. After that, the beam $L_0$ is passed through a beam diameter control device 80 and led to the inside of a drum 82 along the medial axis of the drum 82. A spinner 84 as an optical scanner is provided on the axis of the drum 82.

The spinner 84 has a reflection plane that is placed 45° to the medial axis (rotation axis) and is driven by a motor to rotate at high speed. A rotary encoder 86 is provided with the motor so that a rotating angle ($\theta=\omega t$) of the spinner 84 can be detected. As a result, a pulse signal p to be output at each predetermined rotating angle and a reference position signal $P_0$ representing a reference position for each rotation are output. The beam $L_0$ led to the spinner 84 is focused by a focusing lens 88 arranged on the rotation axis, so that the beam $L_0$ is focused on the inner surface of the drum 82 or a recorded sheet. A controller 90 controls the AODs in synchronization with the rotating angle $\theta$ of the spinner 84 to correct curvatures and intervals of the scanning lines.

In the embodiment, the transparent plate P or the detour optical-path system as shown in FIGS. 3 through 5 is used as the beam diameter control device 80. The use of the beam diameter control device 80 allows the three beams 62a, 62b and 62c to be changed in the focused beam diameter at the same time on the recording surface. For example, when the recording density is high, the transparent plate or the prism $P_{Z1}$ as the beam diameter control device 80 is removed and the beam diameter is reduced. When the recording density is low, either the transparent plate is inserted, or the prism $P_{Z1}$ is inserted and the prisms $P_{Z2}$ and $P_{Z3}$ are moved, thus expanding the beam diameter.

Although the above embodiments are to apply the beam diameter control method and device of the present invention to an optical beam scanning apparatus, the present invention can be applied to other apparatuses. The present invention is applicable to any case where there is a need to change a beam diameter such as in an apparatus for reading images with a laser beam, laser beam machining equipment, a medical instrument and a measuring instrument.

According to the present invention, a beam diameter is changed using a method in which an optical path difference equal to or more than the coherence length of a laser beam is applied to a portion of light flux of the laser beam, so that light utilization can be improved when compared to the conventional method carried out by an aperture stop. The arrangement is simplified, and besides it is inexpensive because of no need to provide any complicated and expensive optical system or zoom system.

The laser beam used here is suitably emitted from a semiconductor laser in a longitudinal multimode. Other semiconductor laser can be used instead, which superposes high-frequency current to emit a laser beam in a longitudinal multimode.

The transparent plate for applying an optical path difference may be a cylinder-like parallel flat plate arranged in light flux of the laser beam. In this case, the transparent plate can be supported by a transparent support plate through which all the light flux is passed. A ring-like transparent plate can be also used instead of the cylinder-like parallel flat plate. Such transparent plate and transparent support plate are preferably placed in the parallel portion (collimated portion) of the laser beam.

The transparent plate may be replaced by a detour optical-path system in which prisms are used to detour a portion of the laser beam. With such construction, the detour optical-path length can be long enough to use a laser beam having a relatively long coherence length.

The beam diameter control method and device of the present invention can be applied to an optical beam scanning apparatus for recording images with a laser beam to be scanned on a recording surface. They are also applicable to an optical beam scanning apparatus for reading images with a laser beam to be scanned on a recording surface. In these cases, the beam diameter can be easily changed in accordance with the change in recording density or reading density.

What is claimed is:

1. A beam diameter control method for changing a diameter of a focused laser beam, comprising:

applying an optical path difference to only a portion of light flux of the laser beam and not to the remainder of the light flux of the laser beam, the optical path difference being equal to or more than a coherence length of the laser beam; and focusing all of the laser beam, including the portion of the light flux to which the optical path difference has been applied and the remainder;

whereby the diameter of the focused laser beam is expanded, and wherein the optical path difference is defined by one of:
a difference in the optical path length traveled by the portion and the remainder of the light flux, and
$(n-n_0)t$, where n is a refractive index of a transparent member through which the portion of light flux passes, t is a thickness of the member, and $n_0$ is a refractive index applicable to the remainder of the light flux.

2. A beam diameter control device for changing a diameter of a laser beam, comprising:

a transparent plate and a focusing lens;

the transparent plate applying an optical path difference to only a portion of light flux of the laser beam and not to the remaining portion of the light flux;

the optical path difference being equal to or more than a coherence length of the laser beam;

the transparent plate being provided in front of the focusing lens;

the focusing lens focusing all of the laser beam, including the portion of the light flux to which the optical path difference has been applied and said remaining portion of the light flux, so as to expand the beam diameter of the laser beam, wherein the optical path difference is defined by:

$$(n-n_0)t$$

where:
n is a refractive index of the transparent plate,
t is a thickness of the transparent plate, and
$n_0$ is a refractive index applicable to said remaining portion of said light flux.

3. The device according to claim 2, wherein a light source of the laser beam is a longitudinal multimode semiconductor laser.

4. The device according to claim 2, wherein a light source of the laser beam is a semiconductor laser which superposes high-frequency current to emit the laser beam in a longitudinal multimode.

5. The device according to claim 2, wherein the transparent plate is a ring-like parallel flat plate placed around the outer edge of the light flux of the laser beam.

6. The device according to claim 2, further comprising a collimator, wherein the light flux of the laser beam is collimated by said collimator and said transparent plate is placed in the collimated light flux of the laser beam.

7. The device according to claim 2, wherein said device is used in an optical beam scanning apparatus for recording images on a recording surface at variable recording density, and wherein the transparent plate is detachable from the optical beam scanning apparatus.

8. The device according to claim 2, wherein said device is used in an optical beam scanning apparatus for reading images from a recorded surface at variable reading density, and wherein the transparent plate is detachable from the optical beam scanning apparatus.

9. The device according to claim 2, wherein the transparent plate is a cylinder-like parallel flat plate placed in the center of the light flux of the laser beam.

10. The device according to claim 9, wherein the transparent plate is supported by a transparent support plate through which all the light flux of the laser beam is passed.

11. A beam diameter control device for changing a beam diameter of a laser beam focused by a focusing lens, comprising an arrangement that diverts, along a detour optical-path, a portion of light flux of the laser beam, a length of the detour optical-path being variable, wherein an optical path difference, defined as a difference, in the optical path length traveled, between the beam portion passing through the detour optical-path and the beam portion not passing through the detour optical-path, is made larger than a coherence length of the laser beam, and wherein said beam portion passing through the detour optical-path and said beam portion not passing through the detour optical-path are combined by said arrangement and focused to expand the diameter of the focused laser beam.

12. A beam diameter control device for changing a beam diameter of a laser beam focused by a focusing lens, comprising an arrangement that diverts, along a detour optical-path, a portion of light flux of the laser beam, a length of the detour optical-path being variable, wherein an optical path difference, defined as a difference, in the optical path length traveled, between the beam portion passing through the detour optical-path and the beam portion not passing through the detour optical-path, is made larger than a coherence length of the laser beam to expand the diameter of the focused laser beam, wherein said beam portion passing through the detour optical-path and said beam portion not passing through the detour optical-path are combined by said arrangement and focused to expand the diameter of the focused laser beam, and wherein said arrangement comprises prisms.

13. The device according to claim 12, wherein the detour optical path length is adjusted by changing a relative position of the prisms.

14. A method of scanning with a focused laser beam, comprising:

selecting one of a first diameter and a second diameter, wherein a respective size of said second diameter is greater than a respective size of said first diameter;

when said first diameter is selected:
providing a laser beam along only a first optical path, and
focusing said laser beam with a lens to provide said focused laser beam with said first diameter;

when said second diameter is selected:
providing said laser beam along said first optical path,
diverting only a part of the light flux of said laser beam from said first optical path to a second optical path to provide a detoured light flux, and allowing the remainder of said light flux of said laser beam to pass along said first optical path, said second optical path rejoining said first optical path; and
focusing together both said detoured light flux and said remainder of said light flux to provide said focused laser beam with said second diameter;

wherein the step of diverting comprises setting the optical path length traveled by the detoured light flux to be greater than the optical path length traveled by the remainder of the light flux by a length that exceeds the coherence length of the laser beam.

15. The method of scanning as set forth in claim 14, wherein the said step of diverting is performed by means of prisms.

16. The method of scanning as set forth in claim 15, further comprising adjusting said respective optical path length of said detoured light flux by moving one or more of said prisms.

17. A beam diameter control method for changing a diameter of a focused laser beam, comprising:

applying an optical path difference to only a portion of light flux of the laser beam, and not to the remainder of the light flux of the laser beam, the optical path difference being equal to or more than a coherence length of the laser beam; and focusing all of the laser beam, including the portion of the light flux to which the optical path difference has been applied, and including the remainder;

whereby the diameter of the focused laser beam is expanded, and wherein the only a portion of the light flux passes through a detour optical path, and the remainder of the light flus does not pass through the detour optical path, and wherein the optical path difference is defined by a difference in the optical path length traveled between the portion passing through the detour optical-path, and the remainder not passing through the detour optical-path.

\* \* \* \* \*